United States Patent
Zhang et al.

(10) Patent No.: US 11,520,593 B1
(45) Date of Patent: Dec. 6, 2022

(54) APPARATUS AND METHOD FOR DISTRIBUTED DATABASE QUERY CANCELLATION BASED UPON SINGLE NODE QUERY EXECUTION ANALYSIS

(71) Applicant: MarkLogic Corporation, San Carlos, CA (US)

(72) Inventors: Yun Zhang, San Carlos, CA (US); Fayez Saliba, San Carlos, CA (US); Christopher Lindblad, San Carlos, CA (US); Joe Pasqua, San Carlos, CA (US)

(73) Assignee: MARKLOGIC CORPORATION, San Carlos, CA (US)

( * ) Notice: Subject to any disclaimer, the term of this patent is extended or adjusted under 35 U.S.C. 154(b) by 377 days.

(21) Appl. No.: 16/719,378

(22) Filed: Dec. 18, 2019

(51) Int. Cl.
| | |
|---|---|
| *G06F 16/2458* | (2019.01) |
| *G06F 9/38* | (2018.01) |
| *G06F 9/52* | (2006.01) |
| *G06F 9/54* | (2006.01) |
| *G06F 11/07* | (2006.01) |
| *G06F 16/33* | (2019.01) |
| *G06F 21/62* | (2013.01) |
| *G06F 16/182* | (2019.01) |

(52) U.S. Cl.
CPC ............ *G06F 9/3877* (2013.01); *G06F 9/524* (2013.01); *G06F 9/542* (2013.01); *G06F 11/076* (2013.01); *G06F 11/0757* (2013.01); *G06F 16/182* (2019.01); *G06F 16/2471* (2019.01); *G06F 16/334* (2019.01); *G06F 21/6218* (2013.01)

(58) Field of Classification Search
CPC ................................................ G06F 16/2471
See application file for complete search history.

(56) References Cited

U.S. PATENT DOCUMENTS

| | | | |
|---|---|---|---|
| 8,271,996 B1 * | 9/2012 | Gould ..................... | G06F 9/542 719/330 |
| 2008/0065588 A1 * | 3/2008 | Aldrich ............. | G06F 16/24542 |
| 2009/0019007 A1 * | 1/2009 | Niina .................. | G06F 16/2471 |
| 2018/0121426 A1 * | 5/2018 | Barsness ............... | G06F 9/5011 |
| 2018/0349178 A1 * | 12/2018 | Painter .................. | G06F 9/5083 |
| 2020/0293370 A1 * | 9/2020 | Rao ........................... | G06F 8/30 |

* cited by examiner

*Primary Examiner* — Charles D Adams
(74) *Attorney, Agent, or Firm* — Cooley LLP

(57) ABSTRACT

A master database module is on a master computer node. Slave database modules are on slave computer nodes connected to the master computer node via a network. A distributed database includes executable code executed by processors on the master computer node and the slave computer nodes to receive a distributed database query at the master computer node. A query execution plan is prepared at the master computer node. The query execution plan is deployed on the slave computer nodes. The query execution plan is executed on the slave computer nodes. The slave computer nodes each perform a single node query execution analysis to selectively produce a query cancellation command. The query cancellation command is propagated to the master computer node and the slave computer nodes. The query execution plan is cancelled on the master computer node and the slave computer nodes.

7 Claims, 2 Drawing Sheets

APPARATUS AND METHOD FOR DISTRIBUTED DATABASE QUERY CANCELLATION BASED UPON SINGLE NODE QUERY EXECUTION ANALYSIS

FIELD OF THE INVENTION

This invention relates generally to a computer network implementing a distributed database. More particularly, this invention is directed toward distributed database query cancellation based upon single node query execution analysis.

BACKGROUND OF THE INVENTION

Query request cancellation is a mechanism for controlling resource-hungry queries that can lead to poor computational performance. While it is common for database management systems to cancel requests based on their runtime, generalizing the cancelling solution to multiple computing resources in a distributed system is very challenging because of the need to share information between numerous computers.

Accordingly, there is a need for improved query request cancellation in a distributed database.

SUMMARY OF THE INVENTION

A master database module is on a master computer node. Slave database modules are on slave computer nodes connected to the master computer node via a network. A distributed database includes executable code executed by processors on the master computer node and the slave computer nodes to receive a distributed database query at the master computer node. A query execution plan is prepared at the master computer node. The query execution plan is deployed on the slave computer nodes. The query execution plan is executed on the slave computer nodes. The slave computer nodes each perform a single node query execution analysis to selectively produce a query cancellation command. The query cancellation command is propagated to the master computer node and the slave computer nodes. The query execution plan is cancelled on the master computer node and the slave computer nodes.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
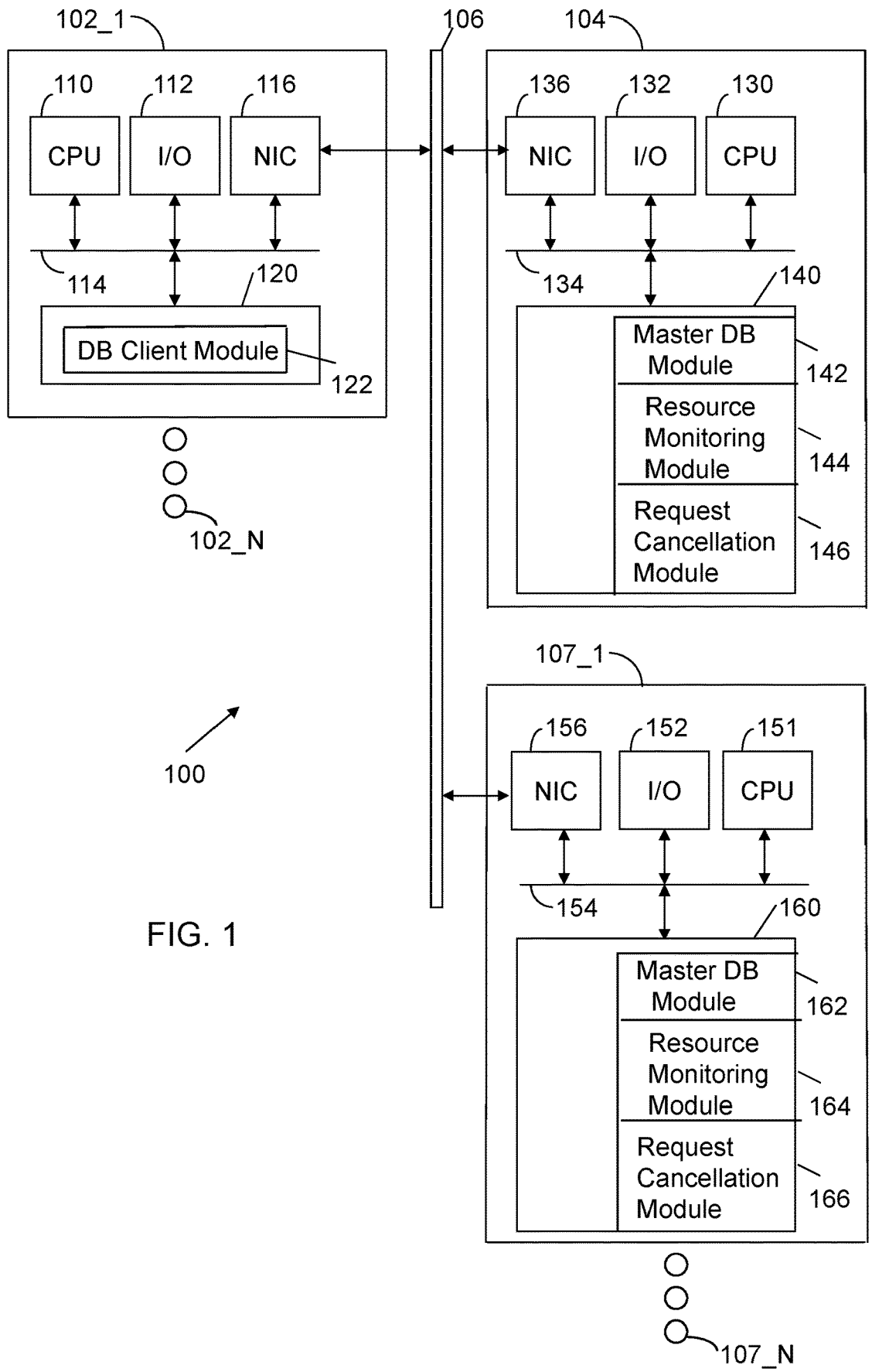
FIG. 1 illustrates a system configured in accordance with an embodiment of the invention.

FIG. 1 illustrates a system 100 configured in accordance with an embodiment of the invention. The system 100 includes a set of client devices 102_1 through 102_N that communicate with a master computer node 104 via a network 106, which may be any combination of wired and wireless networks. A set of slave computer nodes 107_1 through 107_N are also connected to the network 106.

Master computer node 104 and slave computer nodes 107_1 through 107_N implement a distributed database. Client devices 102_1 through 102_N submit distributed database queries to the master computer nodes 104, which operates with the slave computer nodes 107_1 through 107_N to produce query results, which are supplied back to the client devices 102_1 through 102_N.

Client device 102_1 includes a central processing unit 110 and input/output devices 112 connected via a bus 114. The input/output devices 112 may include a keyboard, mouse, touch display and the like. A network interface circuit 116 is also connected to the bus 114 to provide connectivity to network 106. A memory 120 is also connected to the bus. The memory 120 stores a database client module 122 with instructions executed by processor 110 to allow a user to submit distributed database queries to master computer node 104 and receive query results from the master computer node 104.

Master computer node 104 includes a central processing unit 130, input/output devices 132, a bus 134 and a network interface circuit 136. A memory 140 is connected to bus 134. The memory 140 stores instructions executed by processor 130. In particular, the memory 140 stores a master database module 142 to implement master database operations associated with a distributed database. The memory 140 also stores a resource monitoring module 144 with instructions executed by processor 130 to monitor various resource consumption parameters at server 104, as discussed in more detail below. The memory 140 also stores a request cancellation module 146 to implement operations disclosed herein, as discussed below.

Slave computer node 107_1 includes a central processing unit 151, input/output devices 152, a bus 154 and a network interface circuit 156. A memory 160 is connected to the bus 154. The memory stores instructions executed by processor 151. In particular, the memory 160 stores a slave database module 162 to implement slave database operations associated with a distributed database. The memory 160 also stores a resource monitoring module 164 to monitor various resource consumption parameters at node 107_1. The memory 160 also stores a request cancellation module 166 to implement operations disclosed herein.

Figure 2:
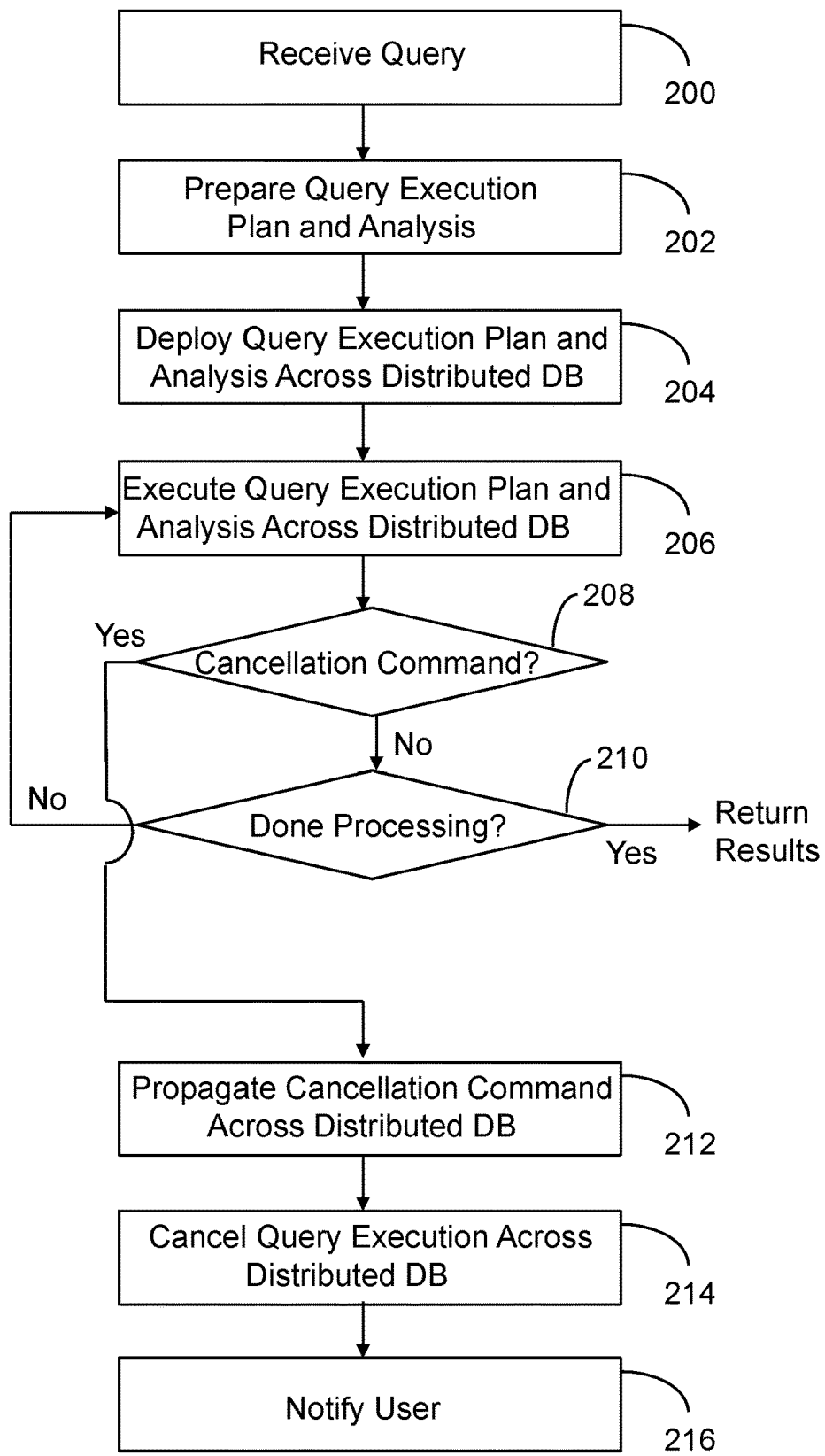
FIG. 2 illustrates processing operations associated with an embodiment of the invention.

FIG. 2 illustrates processing operations associated with an embodiment of the invention. A query is received 200. More particularly, a distributed database query from a client device 102_1 is received at the master computer node 104.

A query execution plan and analysis is prepared 202 by the master computer node 104. The query execution plan specifies the sequence of operations required to process the received query. The query execution analysis specifies impermissible resource consumption metrics to be evaluated at each slave computer node 107_1 through 107_N.

The query execution plan and analysis is deployed 204 across the distributed database, including slave computer nodes 107_1 through 107_N. The slave computer nodes 107_1 through 107_N execute the query execution plan and analysis 206. The master node 104 may also execute a segment of the query execution plan and analysis.

Each slave computer node 107_1 through 107_N performs a single node query execution analysis to selectively produce a query cancellation command. The single node query execution analysis is based upon parameters associated with the single node. That is, with the present invention, query cancellation in a distributed database environment does not require communications between networked computers to determine whether a query cancellation command should be issued. Rather, each computer node in the distributed database has authority to issue a query cancellation command, which will be observed by all other nodes in the distributed database. As discussed in detail below, the resource monitoring module (144 or 164) operates with the request cancellation module (146 or 166) to issue a query cancellation command.

If query cancellation is not appropriate (208—No), it is determined whether the query processing is completed. If so (210—Yes), query results are returned to the master computer node 104, which supplies them to one or more of client devices 102_1 through 102_N. If processing is not completed (210—No), control returns to block 206.

If a query cancellation command is issued (208—Yes), the query cancellation command is propagated 212 across the distributed database via network 106. For example, if the query cancellation command is issued by slave computer 107_1, it is passed to master computer node 104, which directs it to all other slave computer nodes. Query execution is then cancelled across the distributed database 214. That is, query execution on slave computer nodes 107_1 through 107_N is halted, as is query execution on master computer node 104, if applicable. Finally, a user is notified 216. For example, master computer node 104 may advise one or more of client devices 102_1 through 102_N.

In one embodiment, a web service is hosted on master computer node 104. Client computer nodes 107_1 through 107_N send requests to the master computer node 104. Thus, the web service query/request execution can be distributed on the master computer node 104 and the client computer nodes 107_1 through 107_N. In one embodiment, the master computer node 104 establishes a query execution analysis configuration artifact for a current query and communicates it to the client computer nodes 107_1 through 107_N.

A web service consists of several operations/queries referred to as microservices. Different microservices have different resource needs. The disclosed techniques represent a general mechanism that can be applied to multiple computing resources configurable per microservice in a distributed system. Resource limits can be set in a cancellation artifact declaring the conditions under which requests will be cancelled on a specific microservice. The cancellation artifact can be modified dynamically during the operation. In a distributed system, any host can decide to cancel the requests globally based on only the local information it collects.

A cluster has multiple hosts, each running a server instance. When deployed in a cluster, each host communicates with every other host at periodic intervals. There are two roles a host in a cluster can perform: evaluator host (e.g., master computer nodes 104) and data host (e.g., slave computer node 107_1). Evaluator hosts process requests from client machines 102_1 through 102_N and dispatch them to the data hosts. Data hosts store and maintain data. In the communication among hosts within a distributed system, evaluator hosts serve as master hosts. A data host gets the request from an evaluator host and then sends the result data back to the evaluator host. An evaluator host can also play the role of a data host.

Every host in the distributed system has a built-in mechanism that can monitor various resource consumption for every request running on a microservice. Resource consumption relevant to a specific request is computed and updated real time on every host participating in resolving the query/operation while the request is running. This means that a host can tell at any point in time how many resources each request is consuming locally. Since multiple requests can be running concurrently on a server instance (host), the server tracks resource consumption separately for every request.

Web services normally run on a cluster of server instances that are part of a distributed system. A web service can be hosted by multiple server nodes. A web service can be broken down into several microservices, where a microservice comprises a set of queries or operations that are performed against a single or multiple databases. When an application client or a web client issues a request against a web service, the request is dispatched to a microservice that is executed on multiple nodes of a distributed system.

Different microservices have different requirements in terms of resource consumption. For example, queries involving complex data joins might have a high memory and high CPU footprint. Other queries ingesting a large volume of data into a database might have a high input/output or disk usage footprint. Queries updating documents or relational tables might use many locks on certain recourses. Queries running an evaluation of a trained machine-learning model might consume CPU resources and place locks on GPU resources.

For that reason, in one embodiment, there is a separate request cancellation configuration for each microservice. The cancellation configuration can be specified in a cancellation artifact, for example, a JSON/XML file saved on disk or stored in a configuration database. Any request running on a specific microservice will pick up the cancellation configuration associated with the microservice. A cancellation configuration declares functions and conditions (for example upper and lower bounds on specific resources) that control when a resource-heavy request gets cancelled. The cancellation configuration changes are propagated to all the nodes participating in resolving the queries/operations of the request. The cancellation configuration artifact can be modified on the fly, and the configuration changes are picked up by any subsequent request without requiring any server instance to be restarted. A host participating in resolving a request keeps track of the cancellation conditions for each active request running on the host.

Request cancellation can also be configured at the service level, which is responsible for all the microservices running on the same web service. Request cancellation can also be configured at the server instance level, which is responsible for all the services running on the same server instance.

The cancellation conditions can also be modified dynamically for a specific request while the request is running. The new modified cancellation conditions are used for the duration of the request and replace the settings from the cancellation configuration artifact. For example, a specific request can be temporarily permitted to run with lower memory or runtime constraints. A request generated by a user with certain roles and privileges can have different cancellation conditions/constraints from the default configuration. The dynamic changes to the cancellation conditions of a request are propagated to all the hosts in the cluster. Once a host receives the new cancellation conditions for a specific request, it applies them immediately to any query/operation associated with the request. This all takes place without requiring the service or the server instance to be restarted for the changes to take effect.

The execution of a microservice request is distributed to multiple nodes in the cluster. A request needs to be cancelled globally when cancellation conditions are met (for example, resource thresholds are exceeded). However, it is hard to collect and aggregate meter metrics globally without hurting performance. Instead of cancelling requests based on global resource consumption, the nodes decide locally. Any node in the distributed system can choose to cancel the queries globally based on the local information the node collects without the need to know about global resource utilization. This solution is based on the following assumption: statistically, in a distributed system, the workload, the data and the resource consumption related to a request are evenly distributed across all the nodes in the cluster. Therefore, if on one node the resource limitations are exceeded, it is very likely that on all other nodes the resource limitations are exceeded too. When one of the nodes decide to cancel a request, the cancellation decision gets propagated to every node in the cluster.

Each running host in a cluster collects meter metrics (or resource consumption) locally for every request. When request cancellation is configured, and because of the local per-request monitoring capability (mentioned earlier), a host can determine when the resources utilization associated with the request violates the conditions declared in the cancellation configuration (for example, certain thresholds are exceeded). Once a data host detects a violation, it decides to cancel the queries and operations associated with the request. It then triggers the cancellation mechanism locally. The data host sends the cancellation request to the evaluator host. As soon as the evaluator host gets this information, in the next time interval, it notifies all the other data hosts in the cluster. After each data host cancels the request, they send the result back to the evaluator host. In the other situation, when the resource limit is exceeded on an evaluator host, it decides to cancel the request locally and notifies the rest of the hosts. After the cancellation completes on a data host, a cancellation confirmation is propagated back to the evaluator host. No further steps are executed.

This request cancellation mechanism can be applied to various types of computing resources. Below are some examples, but the scope of request cancellation is not limited to these resources.

Elapsed time (seconds): time limit for actively running a request.
Read size (bytes): combined size read from disk during a request execution.
Lock count (count): combined count for the number of times a read/write lock is required during a request execution.

The query execution analysis can combine several resource consumption metrics using a cost function to compute a cost and determine whether the cost exceeds a threshold. If so, a query cancellation command is issued.

The cancellation mechanism is applicable to both server clusters running on-premise where the server software is running on a company's internal computers, and cloud-based server clusters where the server software is hosted on a third-party cloud vendor/provider. Some cost metrics can be computed for every request by taking into account multiple locally collected metrics on every host. The cancellation configuration artifact can include some costing functions and cancellation conditions related to the calculated cost. When the cost exceeds the cost threshold, a request considered too costly to run can be terminated/cancelled using the same cancellation flow described earlier. Cost is computed in terms of resource consumption or in terms of monetary charge/fee.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable medium storing executable code to implement a distributed database, comprising:
a master database module implemented on a master computer node;
slave database modules implemented on slave computer nodes connected to the master computer node via a network, wherein the distributed database includes executable code executed by processors on the master computer node and the slave computer nodes to:
receive a distributed database query at the master computer node,
prepare a query execution plan at the master computer node,
deploy the query execution plan on the slave computer nodes,
execute the query execution plan on the slave computer nodes, wherein the slave computer nodes each perform a single node query execution analysis to selectively produce a query cancellation command, wherein the single node query execution analysis computes real time resource consumption and produces the query cancellation command when a time limit for query execution is exceeded, when the combined size read from disk during query execution is exceeded, when the combined count for a number of read and write locks during query execution is exceeded and when another resource consumption metric is exceeded, propagate the query cancellation command to the master computer node and the slave computer nodes, and cancel the query execution plan on the master computer node and the slave computer nodes.

2. The non-transitory computer readable storage medium of claim 1 wherein the query execution analysis for the query execution plan is configured by the master computer node.

3. The non-transitory computer readable storage medium of claim 1 wherein the single node query execution analysis combines resource consumption metrics using a cost function to compute a cost, wherein the query cancellation command is produced when the cost exceeds a threshold.

4. The non-transitory computer readable storage medium of claim 1 wherein the single node query execution analysis evaluates distributed database privileges of a user submitting the distributed database query to determine an input configuration of the query execution analysis.

5. The non-transitory computer readable storage medium of claim 1 wherein the query execution analysis is configurable at a microservice level.

6. The non-transitory computer readable storage medium of claim 1 wherein the query execution analysis is configurable at a web service level.

7. The non-transitory computer readable storage medium of claim 1 wherein the query execution analysis is configurable while the query execution plan is executing.

* * * * *